US008755495B1

(12) United States Patent
Tovino et al.

(10) Patent No.: US 8,755,495 B1
(45) Date of Patent: *Jun. 17, 2014

(54) MULTIPLE EXTENSION AND LINE APPEARANCE FOR IP TELEPHONY

(75) Inventors: Mike S. W. Tovino, Bend, OR (US); Pramod Madabhushi, Schaumburg, IL (US); Dale Tonogai, Los Altos, CA (US)

(73) Assignee: ShoreTel, Inc., Sunnyvale, CA (US)

( * ) Notice: Subject to any disclaimer, the term of this patent is extended or adjusted under 35 U.S.C. 154(b) by 562 days.

This patent is subject to a terminal disclaimer.

(21) Appl. No.: 13/072,611

(22) Filed: Mar. 25, 2011

Related U.S. Application Data

(63) Continuation of application No. 11/473,517, filed on Jun. 23, 2006, now Pat. No. 7,936,745.

(51) Int. Cl.
*H04M 1/64* (2006.01)

(52) U.S. Cl.
USPC .................................. 379/88.12; 379/376.01

(58) Field of Classification Search
USPC ................ 379/88.11, 88.12, 93.17, 142.17, 379/376.01, 201.04; 370/351–356, 419, 370/463
See application file for complete search history.

(56) References Cited

U.S. PATENT DOCUMENTS

| | | | |
|---|---|---|---|
| 7,106,298 B1 * | 9/2006 | Turner et al. .................. 345/156 |
| 7,480,376 B2 * | 1/2009 | Burritt et al. ............. 379/355.02 |
| 2003/0219029 A1 * | 11/2003 | Pickett .......................... 370/442 |
| 2007/0165809 A1 * | 7/2007 | Nemoto et al. .......... 379/142.06 |

* cited by examiner

*Primary Examiner* — Amal Zenati
(74) *Attorney, Agent, or Firm* — Van Pelt, Yi & James LLP

(57) ABSTRACT

Displaying an IP call status is disclosed. An IP call status notification is received from an IP telephony device. A display update is caused by transmitting a display notification to an IP telephone.

28 Claims, 10 Drawing Sheets

MULTIPLE EXTENSION AND LINE APPEARANCE FOR IP TELEPHONY

CROSS REFERENCE TO OTHER APPLICATIONS

This application is a continuation of co-pending U.S. patent application Ser. No. 11/473,517, entitled MULTIPLE EXTENSION AND LINE APPEARANCE FOR IP TELEPHONY filed Jun. 23, 2006.

RE-VISIT NOTICE

Applicant(s) hereby rescind any disclaimer of claim scope in the parent application (namely U.S. patent application Ser. No. 11/473,517, now issued U.S. Pat. No. 7,936,745) and in the prosecution histories thereof, and hereby advise the US Patent and Trademark Office (USPTO) that the claims in this continuation application may be broader than any claim in the parent, grandparent and great grandparent applications. Accordingly, Applicant(s) notify the USPTO of a need to re-visit the disclaimer of claim scope in the parent application, and to further re-visit all prior art cited in the parent application, including but not limited to cited references over which any disclaimer of claim scope was made in the parent application, and in the prosecution histories thereof. See Hakim v. Cannon Avent Group, PLC, 479 F.3d 1313 (Fed. Cir. 2007). Moreover, any disclaimer made in the current application should not be read into or against the parent.

BACKGROUND OF THE INVENTION

IP telephony offers an alternate technology solution to standard wired telephony. In a standard wired telephony system, phone calls are carried by individual lines. Standard telephony relates a call with a phone line, and for phones connected to multiple phone lines, ringing, active, and hold states can be displayed corresponding to the multiple lines on the phone. Responding to a call that comes in simultaneously to another can be thought of as responding to one of the multiple phone lines—for example, pressing a button to select one of the phone lines that has an in-coming call. However, IP telephony does not use the same technology infrastructure as compared to standard telephony, and a call does not correspond to one physical phone line. Therefore, it is not possible to hook up a single phone line to multiple phones by just hooking up the corresponding phone line, to view the states of the phone call by monitoring the phone line state, or to connect a call by pushing the button that connects the phone handset to the phone line. It would be beneficial in the IP telephony system to be able to hook up phones to multiple lines, monitor the state of multiple lines, and connect the phone to one of multiple lines.

BRIEF DESCRIPTION OF THE DRAWINGS

Various embodiments of the invention are disclosed in the following detailed description and the accompanying drawings.

DETAILED DESCRIPTION

Figure 1:
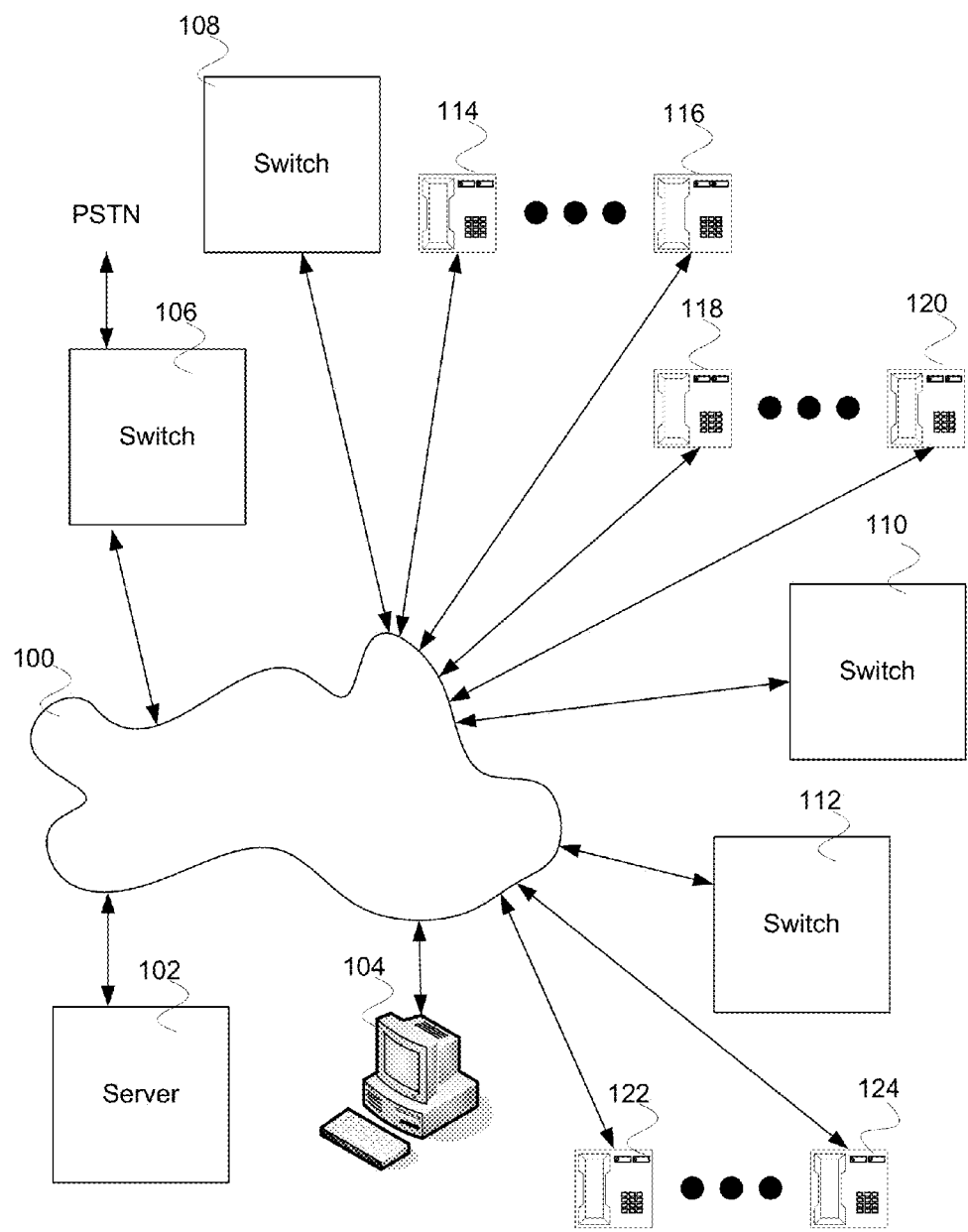
FIG. 1 is a block diagram illustrating an embodiment of a system for multiple line appearance and call extension for IP telephony.

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Multiple extension and line appearance for IP telephony are disclosed. A call status notification is received from an IP telephony device. A display update is caused by transmitting a display notification to an IP telephone. In various embodiments, an IP telephony device comprises an IP telephone, a switch, a server, a switch connected to a PTSN, a server with a server based IP application, or any other appropriate device. In some embodiments, one or more IP telephones include a number of buttons each with an indicator light or display. The one or more IP telephones can monitor/select multiple incoming calls on a number of lines corresponding to the multiple buttons. The state of a call associated with a button is discernable by different visual indicators exhibited by the light or display associated with the button—for example, a slowly flashing green light indicates an incoming call, a steady red light indicates that the call is answered by another phone, a green light indicates that the call is answered by the phone, and a quickly flashing green light indicates that the call is on hold. In some embodiments, icons, other colored lights, or alert tones indicate the various states for a call associated with a button.

In various embodiments, the IP call status notification comprises an in-coming IP call notification, a pick-up incoming IP call notification, a hold IP call notification, an un-hold IP call notification, an IP call dropped notification, or an out-going IP call notification, or any other appropriate notification. In various cases, the display comprises an indicator light, an indicator light or display on a phone, an indicator light or display on a switch, an indicator or display on a computer display, an indicator light associated with a button, a display, a text or number display, an icon display, an image display, or any other appropriate display or light. Updating the display can include turning an indicator light on, turning an indicator light off, selecting a color for the indicator on light, selecting flashing for the indicator light, selecting a flashing pattern for the indicator light, selecting steady for the indicator light, displaying an image, displaying an icon, displaying a string of text or numbers, or any other appropriate way of updating a display. In various embodiments, causing a display update includes transmitting a notification to one or more of the following: a server, a switch, a phone, a telephony management engine, a display service engine, a server display service engine, a phone display service engine, a switch display service engine, a multiple line appearance engine, or any other appropriate way to cause a display to update.

Operations may also be performed. Operations include associating a call with a slot, receiving a notification to pick-up a call, transmitting a notification to redirect a call, receiving a notification that a redirect of a call succeeded, receiving a redirected call, parking a call in a slot, clearing a call in a slot, or any other appropriate operation.

FIG. 1 is a block diagram illustrating an embodiment of a system for multiple line appearance and call extension for IP telephony. In the example shown, network 100 can be comprised of the Internet, a local area network, a wide area network, a wired network, a wireless network, or any other network appropriate for carrying IP traffic. Switch 106, server 102, a plurality of computers (represented by computer 104), a plurality of switches (represented by switches 108, 110, and 112) and a plurality of phones (represented by phones 114 and 116 associated with switch 108, phones 118 and 120 associated with switch 110, and phones 122 and 124 associated with switch 112) are in communication with network 100. Switch 106, which is part of an IP telephony system, is also coupled to a public switched telephone network (PSTN) and converts a phone call from/to the PSTN. Server 102, which is part of an IP telephony system, includes IP telephony functionality such as voice mail, call centers, monitoring, management services, database management, etc. Computer 104, which is part of an IP telephony system, includes personal call management tools such as call forwarding and voice mail access and interfaces. The plurality of switches, represented in FIG. 1 by switches 106, 108, 110, and 112, enables a call associated with an individual IP telephone to be connected with an IP telephone or a PSTN connected phone.

In some embodiments, one or more incoming calls arrive at the IP telephone system and appear as calls associated with buttons on the phones. A user of the phone can discern the state of the call by observing the visual indicators on the phone (e.g., lights, displays and their states that indicate incoming call, held call, call answered and active locally, and/or call answered and active remotely). The call can be answered, held, dropped, or transferred based on manipulating the buttons on the phone.

Figure 2:
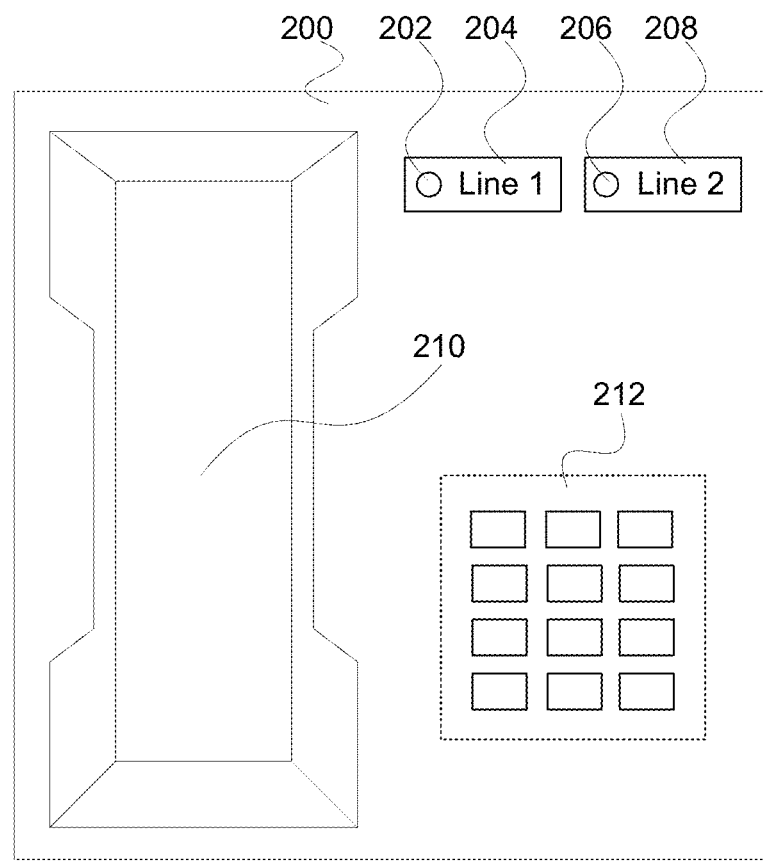
FIG. 2 is a block diagram illustrating an IP telephone.

FIG. 2 is a block diagram illustrating an IP telephone. In some embodiments, phones 114, 116, 118, 120, 122, and/or 124 comprise phone 200 of FIG. 2. In the example shown, phone 200 includes handset 210, line/extension buttons, (represented in FIG. 2 by button 204 and 208), and dialing buttons 212. Handset 210 includes a speaker so that the call can be heard by a user and a microphone so that a user's voice utterances or other sounds can be converted for the call. In various embodiments, handset 210 communicates wirelessly or through a wire (not shown in FIG. 2) to the base of phone 200. A line extension button—for example, 204 and 208—includes a visual indicator or display—for example, 202 and 206 for buttons 204 and 208, respectively—that can indicate the state of a call associated with the button. The button can also be used to cause a change in state of a call—for example, if the call is in-coming, the button can be depressed to answer the call. In various embodiments, the indicator or display of a button comprises a light, an LED light, a multi-colored light, a display, an LCD array display, a pixel display, an icon display, or any other appropriate indicator or display for a button. In some embodiments, phone 200 includes a button that can be used to cause a call to hold and/or a button that can be used to cause a call to transfer. In some embodiments, phone 200 displays caller ID information on a display and acquires/transmits the caller ID information during in-coming and out-going call handling.

Figure 3A:
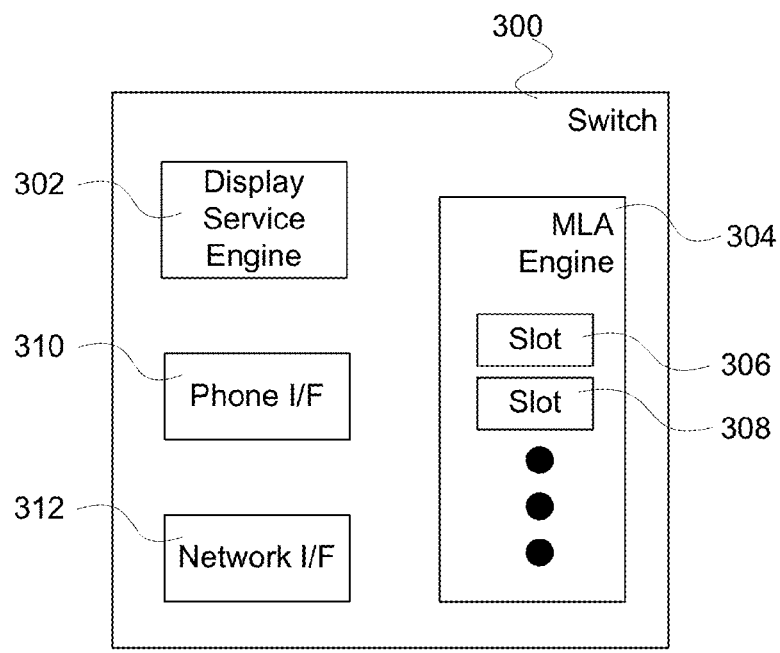
FIG. 3A is a block diagram illustrating an embodiment of an IP telephony switch.

FIG. 3A is a block diagram illustrating an embodiment of an IP telephony switch. In some embodiments, switches 106, 108, 110, and 112 of FIG. 1 comprise switch 300 of FIG. 3A. In the example shown, switch 300 includes display service engine 302, multiple extension and line appearance (MLA) engine 304, phone interface (I/F) 310, and network interface (I/F) 312. Display service engine 302 receives messages from other switches, servers, phones, and/or computers that determine the state, or change the state, associated with a call. The call states, or changes of state, are used to determine a corresponding state, or change of state, for the displays or indicators associated with a button that is associated with the call. MLA engine 304 enables multiple lines to be handled by the IP telephony system. MLA engine 304 receives messages from other switches, servers, phones, and/or computers that determine the state, or change the state, associated with a call. MLA engine 304 transmits call state information to local and remote switch display service engines and/or one or more servers' display service engine. MLA engine 304 includes a plurality of slots, represented in FIG. 3A by slot 306 and slot 308, that are used to store the internal representation of a call. Phone I/F 310 acts as a communication interface between switch 300 and one or more phones. Network I/F 312 acts as a communication interface between switch 300 and network 100. In some embodiments, a switch centric communication model has messages regarding the state, or change of state, of a call distributed appropriately using MLA engine 304 to other switches and thereby to phones—for example, MLA 304 receives a message regarding a state, or change of state, of a call from an IP telephony system element (e.g., a phone, a switch, etc.) and the MLA engine 304 distributes the message to switch display services to change the state of button indicators associated with the call.

Figure 3B:
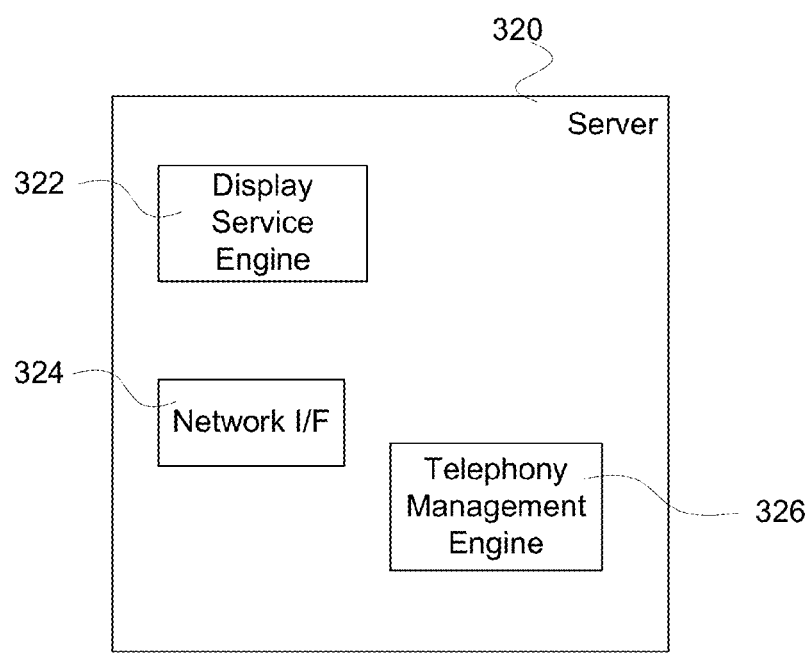
FIG. 3B is a block diagram illustrating an embodiment of an IP telephony server.

FIG. 3B is a block diagram illustrating an embodiment of an IP telephony server. In some embodiments, server 102 of FIG. 1 comprises server 320 of FIG. 3B. In the example shown, server 320 includes display service engine 322, network interface (I/F) 324, and telephony management engine 326. Network I/F 324 acts as a communication interface between server 320 and network 100. Telephony management engine 326 relays messages that are used by switches, servers, phones, and/or computers to determine the state, or changes of state, associated with a call. Display service engine 322 receives the messages from the telephony management engine 326. The call states, or changes of state, are used to determine a corresponding state, or change of state, for the displays or indicators associated with a button that is associated with the call. In some embodiments, a server centric communication model has messages regarding the state, or change of state, of a call distributed appropriately to telephony management engine 326, then to display service engine 322 which then sends messages to update the displays—for example, telephony management engine 326 receives a message regarding a state, or change of state, of a call from an IP telephony system element (e.g., a phone, a switch, etc.), the message is relayed to the display service engine 322 and the display service engine 322 distributes the message to change the state of button indicators associated with the call.

Figure 4:
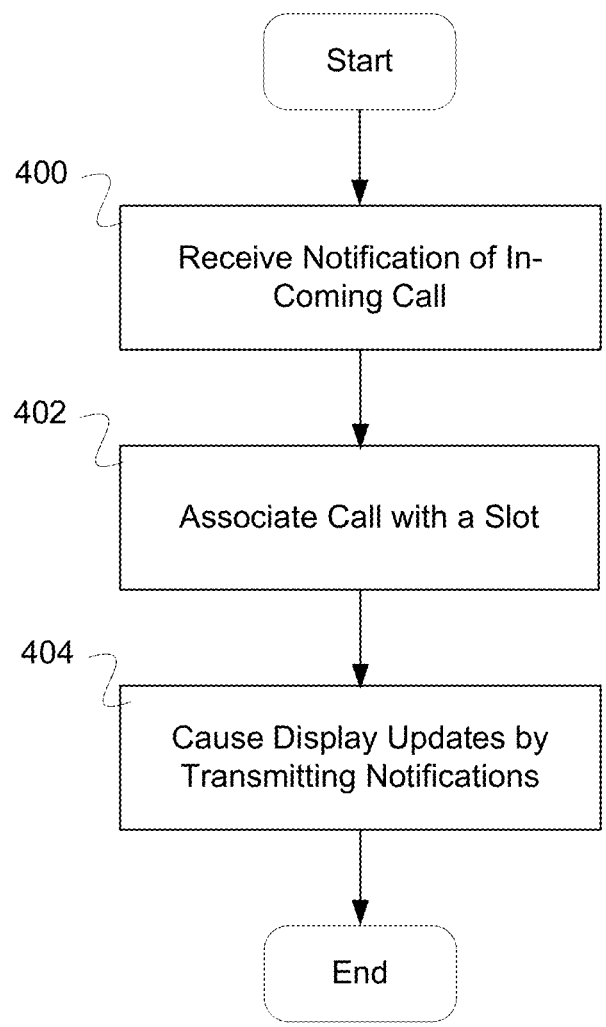
FIG. 4 is a flow diagram illustrating a process for multiple line appearance for an IP telephony system.

FIG. 4 is a flow diagram illustrating a process for multiple line appearance for an IP telephony system. In some embodiments, the process of FIG. 4 is executed by MLA engine 304 of FIG. 3A. In the example shown, in 400 a notification of an in-coming call is received. In some embodiments, a PSTN call arrives at a switch (e.g., switch 106 in FIG. 1). The call grabs a slot in an MLA engine (e.g., MLA engine 304 of FIG. 3A) and is placed in an offering state or a ringing state. In 402, the call is associated with a slot. In 404, display updates are caused by transmitting notifications. In some embodiments, an event notice is sent to the local switch's display service engine (e.g., display service engine 302 of FIG. 3A), and indirectly to a server's display service engine (e.g., display service engine 322 of FIG. 3B) via the server's telephony management engine (e.g., telephony management engine 326 of FIG. 3B). In some embodiments, the event notice is sent directly to a server's display service engine without requiring a telephony management engine. The local switch display service engine updates the displays for all locally connected phones that have buttons associated with the call. The server's display service engine relays messages to other switch display service engines via the server's telephony management engine. At each of the other switches, the display service engines update the displays for all locally attached phones that have buttons associated with the call.

Figure 5:
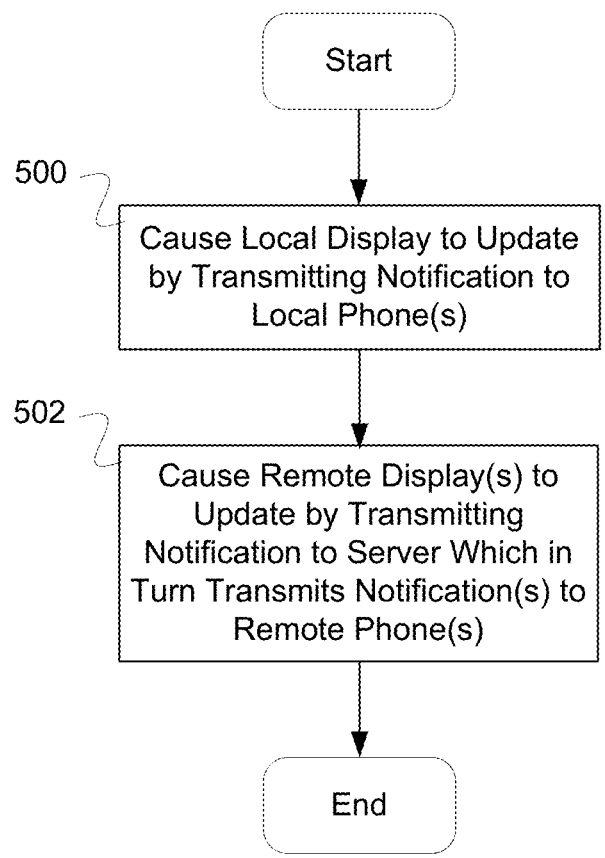
FIG. 5 is a flow diagram illustrating a process for causing display updates.

FIG. 5 is a flow diagram illustrating a process for causing display updates. In some embodiments, the process of FIG. 5 is used to implement 404 of FIG. 4. In the example shown, in 500 local displays are caused to update by transmitting notification to local phone(s). An event notice is sent to the local switch's display service engine. The local switch display service engine updates the displays for all locally connected phones. In 502, remote displays are caused to update by transmitting notification(s) to remote phone(s). An event notice is sent to a server's display service engine (e.g., display service engine 322 of FIG. 3B) via a server's telephony management engine (e.g., telephony management engine 326 of FIG. 3B). The server's display service engine relays messages to other switch display service engines via the server's telephony management engine. At each of the other switches, the display service engines update the displays for all locally attached phones.

Figure 6:
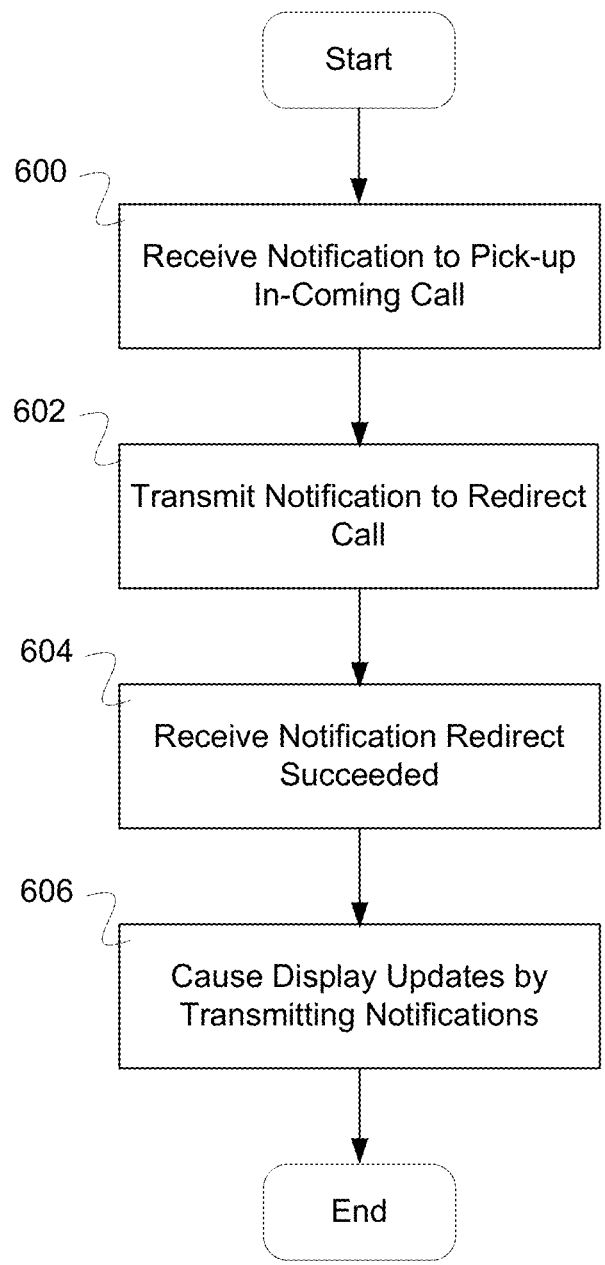
FIG. 6 is a flow diagram illustrating a process for multiple line appearance for an IP telephony system.

FIG. 6 is a flow diagram illustrating a process for multiple line appearance for an IP telephony system. In some embodiments, the process for FIG. 6 is executed by MLA engine 304 of FIG. 3A. In the example shown, in 600 notification is received to pick-up in-coming call. In some embodiments, a call is answered by taking the handset off hook, by pressing the button corresponding to the in-coming call, by answering pressing a soft key, or any other appropriate way of picking up an in-coming call. The display service engine for the phone that is picking up the call sends a notification to a MLA engine (e.g., MLA engine 304 of FIG. 3A). If two users on two different phones pick-up a call, the first user is connected to the call and the other user is informed that the call has been picked up. If the two users simultaneously pick-up the call, then a random user will be connected to the call and the other user is informed that the call has been picked up. In 602, notification is transmitted to redirect the call. In some embodiments, the MLA engine tells the switch that has the in-coming call from the PSTN to redirect the call to the phone that picked up the call. The switch that is associated with the phone that picked up the call sends a notification to the MLA engine that the pick-up (i.e., the redirect to the pick-up phone) was successful. In 604, notification is received that redirect succeeded. In 606, display updates are caused by transmitting notifications. In some embodiments, the notification is similar to 404 of FIG. 4.

Figure 7:
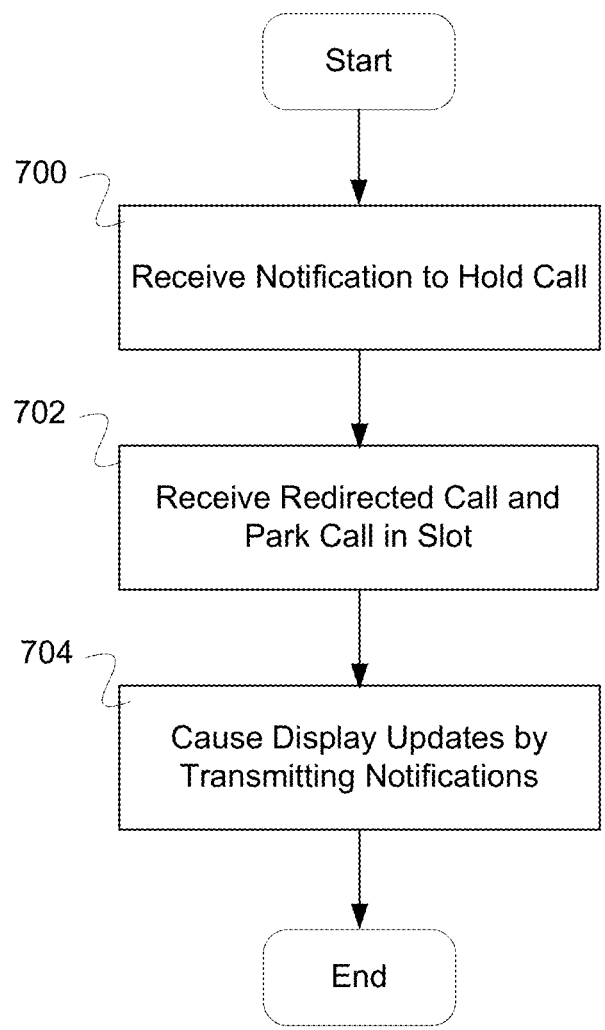
FIG. 7 is a flow diagram illustrating a process for multiple line appearance for an IP telephony system.

FIG. 7 is a flow diagram illustrating a process for multiple line appearance for an IP telephony system. In some embodiments, the process for FIG. 7 is executed by MLA engine 304 of FIG. 3A. In the example shown, in 700 notification is received to hold a call. In some embodiments, a button is pushed to indicate that a call is to be put on hold. The display service engine on the phone that indicates the call is to be put on hold notifies the switch that received the in-coming PTSN call to redirect the call to its assigned slot in the MLA engine (e.g., MLA engine 304 of FIG. 3A). In 702, the redirected call is received and the call is parked in its slot. In 704, display updates are caused by transmitting notifications. In some embodiments, the notification is similar to 404 of FIG. 4.

Figure 8:
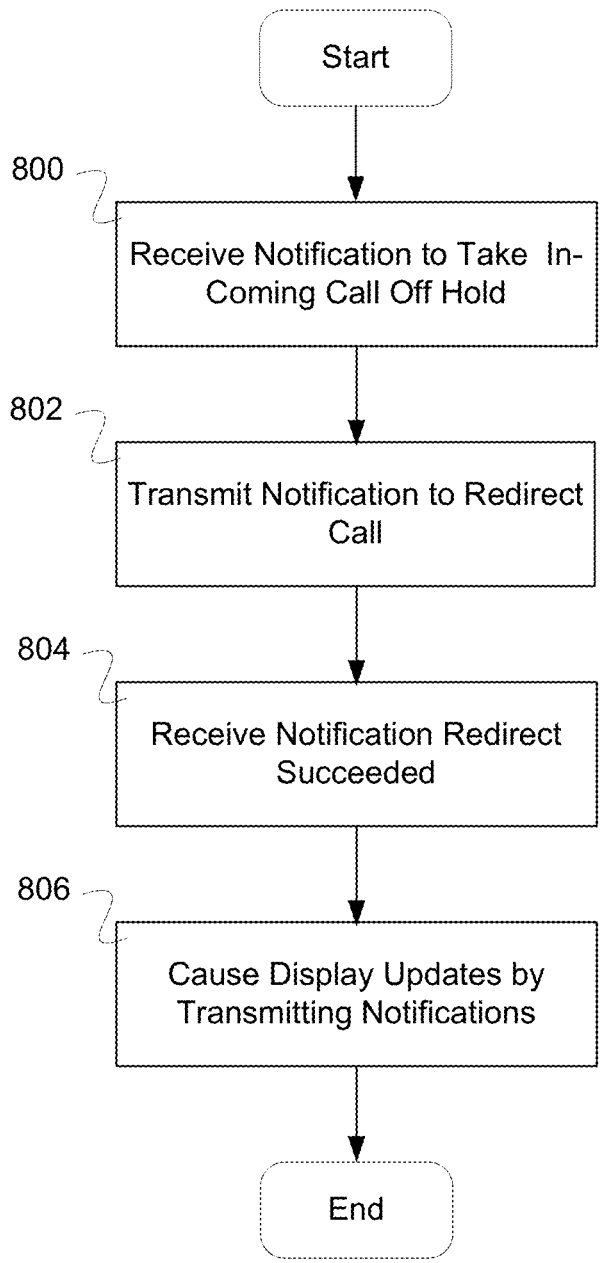
FIG. 8 is a flow diagram illustrating a process for multiple line appearance for an IP telephony system.

FIG. 8 is a flow diagram illustrating a process for multiple line appearance for an IP telephony system. In some embodiments, the process for FIG. 8 is executed by MLA engine 304 of FIG. 3A. In the example shown, in 800 notification is received to take a call off hold. In some embodiments, the display service engine on the phone that indicates the call is to be taken off hold notifies the MLA engine to unhold (un-park) the call. In 802, notification is transmitted to redirect the call. In some embodiments, the MLA engine notifies the switch that received the in-coming PTSN call to redirect the call to the phone that requested the unholding of the call. The call is redirected. In 804, notification is received that redirect succeeded. In 806, display updates are caused by transmitting notifications. In some embodiments, the notification is similar to 404 of FIG. 4.

Figure 9:
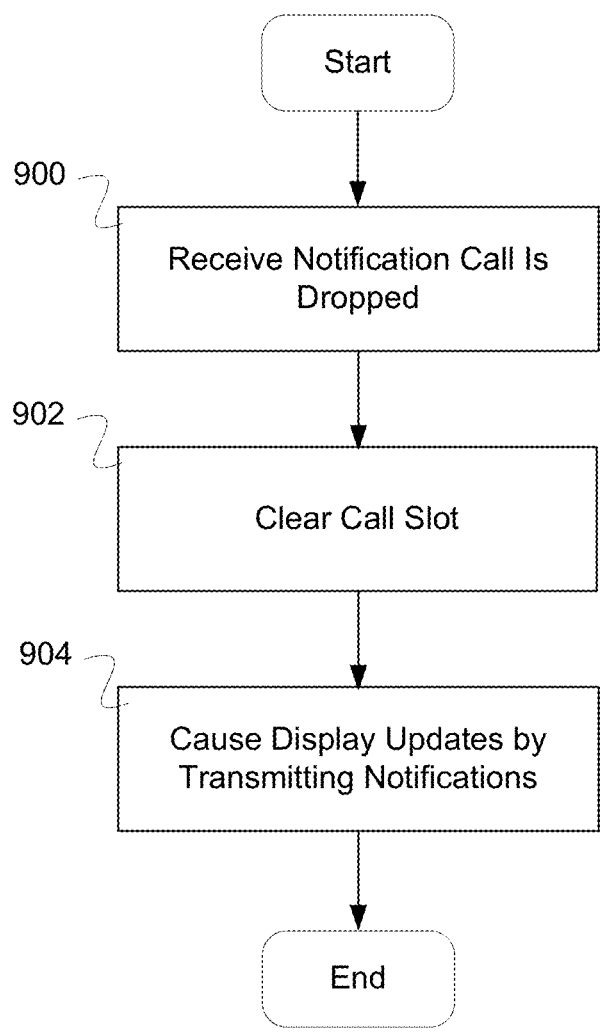
FIG. 9 is a flow diagram illustrating a process for multiple line appearance for an IP telephony system.

FIG. 9 is a flow diagram illustrating a process for multiple line appearance for an IP telephony system. In some embodiments, the process for FIG. 9 is executed by MLA engine 304 of FIG. 3A. In the example shown, in 900 notification is received to drop a call. In some embodiments, the display service engine for the phone that is being disconnected from an active call notifies the MLA engine to clear the slot associated with the call. In 902, the slot is cleared. In 904, display updates are caused by transmitting notifications. In some embodiments, the notification is similar to 404 of FIG. 4.

Figure 10:
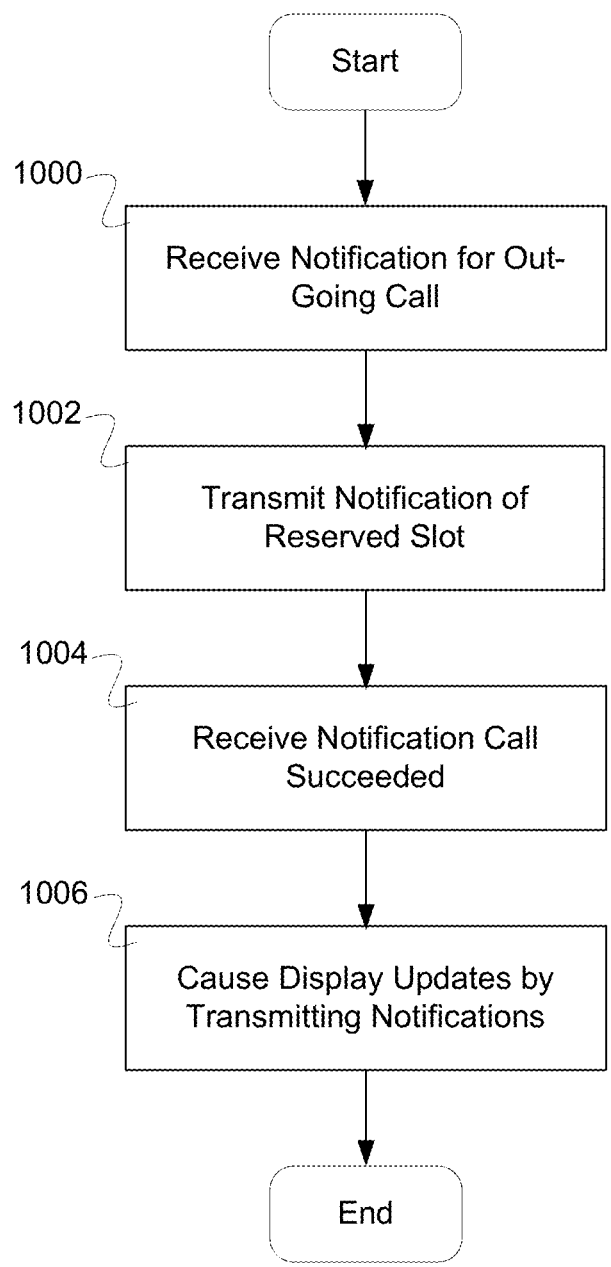
FIG. 10 is a flow diagram illustrating a process for multiple line appearance for an IP telephony system.

FIG. 10 is a flow diagram illustrating a process for multiple line appearance for an IP telephony system. In some embodiments, the process for FIG. 10 is executed by MLA engine 304 of FIG. 3A. In the example shown, in 1000 notification is received for an out-going call. In various embodiments, notification is generated after a user presses a button for a line to initiate a call, after a user picks up the hand set to initiate a call where a line (e.g., line 1) is automatically selected, or any other appropriate method of indicating that an out-going call is desired. The display service engine on the phone that initiates the outgoing call notifies a MLA engine that an outgoing call is desired. In 1002, notification is transmitted that a slot is reserved. In some embodiments, the phone then plays a dial tone for the user and the user can dial the desired party to call. The display service engine on the phone that initiates the out-going call notifies the switch that is connected to PTSN to connect the out-going desired call. In 1004, notification is received that call succeeded. In some embodiments, the switch notifies the MLA engine that the call is connected. In 1006, display updates are caused by transmitting notifications. In some embodiments, the notification is similar to 404 of FIG. 4.

In some embodiments, a call can be transferred out of the MLA engine slot to voice mail, an extension external to the multiple lines handled by the MLA, or in the event that the slots are all occupied on the MLA. In these cases, the MLA engine treats the event similar to a hang up or termination; the call is no longer associated with a slot and is not associated with a line or the indicator associated with the button associated with the line.

In some embodiments, a user that does not have the line associated with an incoming call on his/her phone can pick up an in-coming call on the line by dialing a code on his/her phone or push a designated button. The call will be transferred out of the multiple lines handled by the MLA. In this case, the MLA engine treats the event similar to a hang up or termination; the call is no longer associated with a slot and is not associated with a line or the indicator associated with the button associated with the line.

In various embodiments, instead of slots on the MLA engine, multiple user extensions or slots on user extensions are used for the multiple line appearance and an extension engine substitutes for the MLA engine role.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for displaying IP call status comprising:
   receiving an IP call status notification from an IP telephony device;
   storing an updated status associated with a slot, wherein the slot is associated with an IP call, wherein the slot is used to store an internal representation of a call, and wherein the IP call status notification is associated with the IP call; and
   transmitting a first display notification to a first IP telephone which is one of a plurality of IP telephones associated with the IP call status notification, wherein each of the plurality of IP telephones includes an interface that allows a user to select a call from a plurality of IP calls, and wherein transmitting the first display notification causes a display associated with the first IP telephone to update a first visual indicator corresponding to the IP call.

2. A method as in claim 1, further comprising:
   transmitting a notification to a remote display service, wherein the notification to the remote display service indicates that the remote display service is to transmit a second display notification to a second IP telephone, wherein the second IP telephone is one of the plurality of IP telephones associated with the IP call status notification, and wherein the second display notification is designed to indicate that a second display associated with the second IP telephone is to update a second visual indicator corresponding to the IP call.

3. A method as in claim 1, further comprising:
   in the event that the IP call is picked up on a phone not having a line associated with the IP call:
   updating the slot so that the slot is no longer associated with the IP call; and
   transmitting a third display notification to the first IP telephone to update the first visual indication.

4. A method as in claim 1, wherein the interface comprises a button.

5. A method as in claim 1, wherein the IP call status notification comprises an in-coming IP call notification.

6. A method as in claim 1, wherein the IP call status notification comprises a hold IP call notification.

7. A method as in claim 1, wherein the IP call status notification comprises a pick-up in-coming IP call notification, wherein the first IP telephone comprises a phone which picked up the IP call, and wherein the first visual indicator identifies the first IP telephone as having picked up the call, wherein the first visual indicator is different than visual indicators corresponding to the IP call at other IP telephones.

8. A method as in claim 1, wherein the first display notification indicates that the IP call is answered by another of the plurality of IP telephones, and wherein the first visual indicator is updated to indicate that the call is answered by another of the plurality of IP telephones.

9. A method as in claim 1, further comprising:
   transmitting a second display notification to a second IP telephone which is one of the plurality of IP telephones associated with the IP call status notification, wherein a third IP telephone which is one of the plurality of IP telephones associated with the IP call status notification has answered the IP call, and wherein the second display notification is designed to indicate that a second display associated with the second IP telephone is to update a second visual indicator corresponding to the IP call to indicate that the third IP telephone answered the call.

10. A system for displaying IP call status comprising:
    a processor configured to:
    receive an IP call status notification from an IP telephony device;
    store an updated status associated with a slot, wherein the slot is associated with an IP call, wherein the slot is used to store an internal representation of a call, and wherein the IP call status notification is associated with the IP call; and
    transmit a first display notification to a first IP telephone which is one of a plurality of IP telephones associated with the IP call status notification, wherein each of the plurality of IP telephones includes an interface that allows a user to select a call from a plurality of IP calls, and wherein transmitting the first display notification causes a display associated with the first IP telephone to update a first visual indicator corresponding to the IP call; and
    a memory coupled with the processor, wherein the memory is configured to provide the processor with instructions.

11. A system as in claim 10, wherein the processor is further configured to:
    transmit a notification to a remote display service, wherein the notification to the remote display service indicates that the remote display service is to transmit a second display notification to a second IP telephone, wherein the second IP telephone is one of the plurality of IP telephones associated with the IP call status notification, and wherein the second display notification is designed to indicate that a second display associated with the second IP telephone is to update a second visual indicator corresponding to the IP call.

12. A system as in claim 10, wherein the processor is further configured to:
in the event that the IP call is picked up on a phone not having a line associated with the IP call:
update the slot so that the slot is no longer associated with the IP call; and
transmit a third display notification to the first IP telephone to update the first visual indication.

13. A system as in claim 10, wherein the interface comprises a button.

14. A system as in claim 10, wherein the IP call status notification comprises an in-coming IP call notification.

15. A system as in claim 10, wherein the IP call status notification comprises a hold IP call notification.

16. A system as in claim 10, wherein the IP call status notification comprises a pick-up in-coming IP call notification, wherein the first IP telephone comprises a phone which picked up the IP call, and wherein the first visual indicator identifies the first IP telephone as having picked up the call, wherein the first visual indicator is different than visual indicators corresponding to the IP call at other IP telephones.

17. A system as in claim 10, wherein the first display notification indicates that the IP call is answered by another of the plurality of IP telephones, and wherein the first visual indicator is updated to indicate that the call is answered by another of the plurality of IP telephones.

18. A system as in claim 10, further comprising:
transmitting a second display notification to a second IP telephone which is one of the plurality of IP telephones associated with the IP call status notification, wherein a third IP telephone which is one of the plurality of IP telephones associated with the IP call status notification has answered the IP call, and wherein the second display notification is designed to indicate that a second display associated with the second IP telephone is to update a second visual indicator corresponding to the IP call to indicate that the third IP telephone answered the call.

19. A computer program product for displaying IP call status, the computer program product being embodied in a computer readable non-transitory storage medium and comprising computer instructions for:
receiving an IP call status notification from an IP telephony device;
storing an updated status associated with a slot, wherein the slot is associated with an IP call, wherein the slot is used to store an internal representation of a call, and wherein the IP call status notification is associated with the IP call; and
transmitting a first display notification to a first IP telephone which is one of a plurality of IP telephones associated with the IP call status notification, wherein each of the plurality of IP telephones includes an interface that allows a user to select a call from a plurality of IP calls, and wherein transmitting the first display notification causes a display associated with the first IP telephone to update a first visual indicator corresponding to the IP call.

20. A device for displaying IP call status comprising:
a display;
an interface that allows a user to select a call from a plurality of IP calls;
a handset; and
a network interface capable of transmitting a first IP call status notification and receiving a first display notification, wherein the first display notification is transmitted to each of a plurality of IP telephones associated with a second IP call status notification, wherein the first display notification causes the display to update a first visual indicator corresponding to an IP call, wherein the first display notification causes storing of an updated status associated with a slot, wherein the slot is used to store an internal representation of the IP call, and wherein the second IP call status notification is associated with the IP call.

21. A device as in claim 20, wherein the network interface is further capable of:
transmitting a notification to a remote display service, wherein the notification to the remote display service indicates that the remote display service is to transmit a second display notification to a second IP telephone, wherein the second IP telephone is one of the plurality of IP telephones associated with the second IP call status notification, and wherein the second display notification is designed to indicate that a second display associated with the second IP telephone is to update a second visual indicator corresponding to the IP call.

22. A device as in claim 20, wherein,
in the event that the IP call is picked up on a phone not having a line associated with the IP call:
updating the slot so that the slot is no longer associated with the IP call; and
transmitting a third display notification to the first IP telephone to update the first visual indicator.

23. A device as in claim 20, wherein the interface comprises a button.

24. A device as in claim 20, wherein the first IP call status notification comprises an in-coming IP call notification.

25. A device as in claim 20, wherein the second IP call status notification comprises a hold IP call notification.

26. A device as in claim 20, wherein the second IP call status notification comprises a pick-up in-coming IP call notification, wherein the first IP telephone comprises a phone which picked up the IP call, and wherein the first visual indicator identifies the first IP telephone as having picked up the call, wherein the first visual indicator is different than visual indicators corresponding to the IP call at other IP telephones.

27. A device as in claim 20, wherein the first display notification indicates that the IP call is answered by another of the plurality of IP telephones, and wherein the first visual indicator is updated to indicate that the call is answered by another of the plurality of IP telephones.

28. A device as in claim 20, wherein the network interface is further capable of:
transmitting a second display notification to a second IP telephone which is one of the plurality of IP telephones associated with the IP call status notification, wherein a third IP telephone associated with the IP call status notification has answered the IP call, and wherein the second display notification is designed to indicate that a second display associated with the second IP telephone is to update a second visual indicator corresponding to the IP call to indicate that the third IP telephone answered the call.

* * * * *